United States Patent Office 2,958,556
Patented Nov. 1, 1960

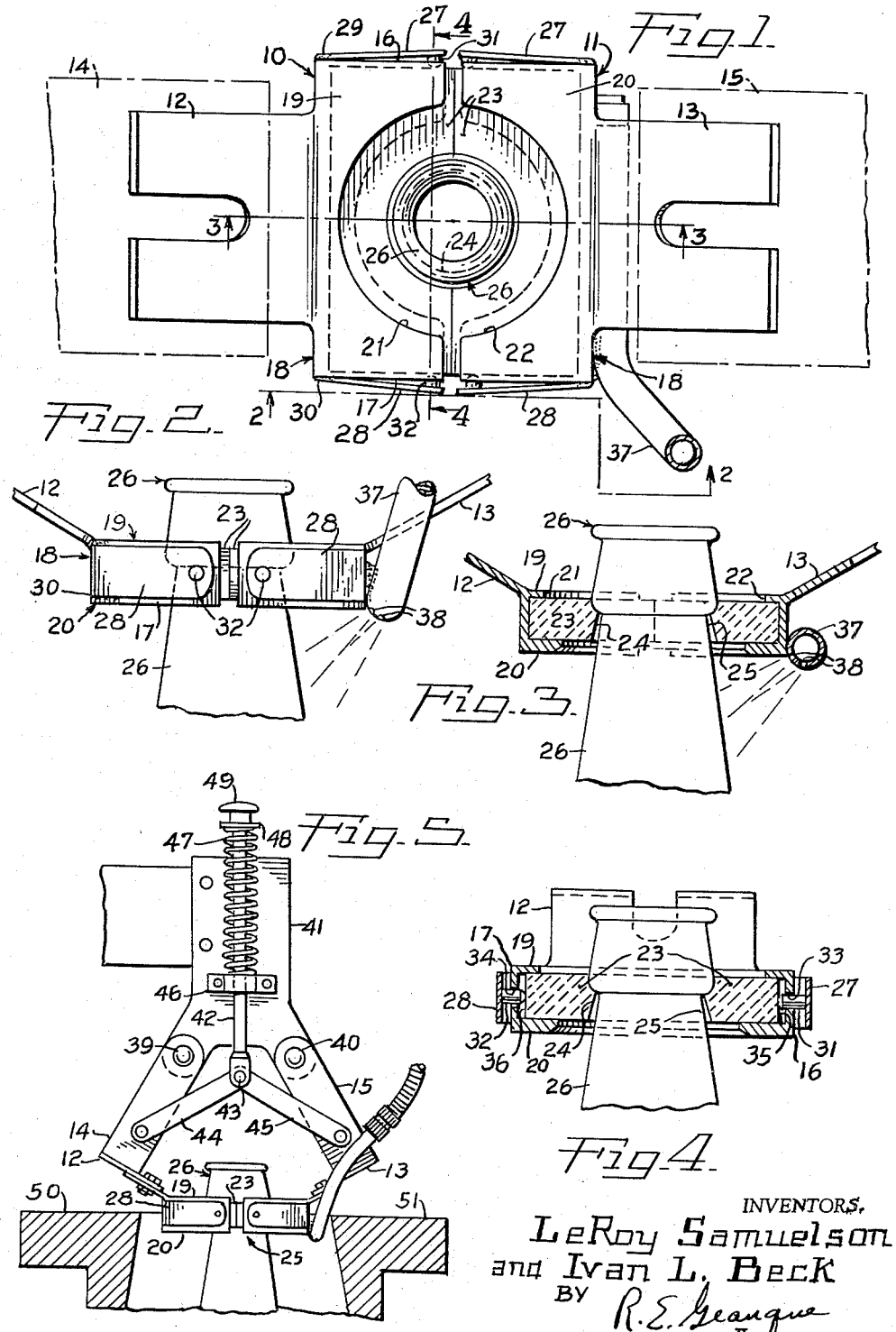

2,958,556

BOTTLE TAKE-OUT JAWS

Le Roy Samuelson, Los Angeles, Calif. (14285 Hubbard St., San Fernando, Calif.), and Ivan L. Beck, 25009 N. Chestnut, Newhall, Calif.

Filed Apr. 7, 1959, Ser. No. 804,663

4 Claims. (Cl. 294—86)

The present invention relates to bottle take-out and transfer jaws, and, more particularly, to bottle take-out jaws for use in handling and moving bottles immediately after their manufacture and while still in an extremely hot condition.

One of the objects of the present invention is to provide bottle take-out and transfer jaws constituting a bottle gripper with casings adapted to interchangeably hold any one matched pair of a plurality of matched pairs of refractory inserts having configurational portions for gripping different sizes and shapes of bottle necks.

Another object of this invention is the provision of a bottle gripping device with casings having spring detent means adapted for ready engagement and disengagement with any one pair of a plurality of pairs of refractory inserts.

According to the present invention, a bottle gripping device is provided with a pair of hollow casings, each having an open end adapted to face the other, and a pair of refractory elements, each removably secured within a respective one of the casings and having a portion projected through the open end, such portion having a configuration substantially complementary to the shape of the neck of a bottle to be gripped, the casings being selectively movable toward and away from each other for selective engagement and disengagement of the bottle neck by the configurational portions of the refractory elements. In a preferred embodiment of this invention, spring means are provided, on opposite sides of each casing, including detent portions which pass through apertures in the sides of the casings so as to frictionally engage the sides of the inserted refractory elements. Preferably, each casing is provided with a top and a bottom plate having a cut-out portion to permit ease of manual grasping and removing of the insert from the casing.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which, Figure 1 is a top plan view of a bottle gripper in accordance with the present invention, shown in engagement with the neck of a bottle;

Figure 2 is a fragmentary side elevational view as seen along line 2—2 in Figure 1;

Figure 3 is a fragmentary side sectional view as seen along line 3—3 in Figure 1;

Figure 4 is a fragmentary end sectional view as seen along line 4—4 in Figure 1; and Figure 5 is a reduced size side elevational view of the device illustrated in Figures 1 to 4, also showing actuator means for operating the bottle gripper.

Referring to the drawing, the device includes a pair of matching casings 10 and 11 having outwardly projecting arms 12 and 13, respectively, secured to actuating arms 14 and 15, respectively. Each of the casings 10 and 11 has full lateral sides 16 and 17 and a full back end 18. Top and bottom plates or panels 19 and 20, respectively, of each casing are cut away along the circular lines 21 and 22, respectively, so that each casing 10 and 11 comprises an open end casing for receiving a refractory insert 23 which can be removed by manually grasping the insert 23 where it is exposed by the cut-out lines 21 and 22. Each insert 23 has a configurational cut-out surface 24 so that, when the casings 10 and 11 are moved toward each other, the cut-out surface 24 forms a circular opening approximately the size of neck 25 of bottle 26. The refractory inserts 23 are held firmly within the casings 10 and 11 by means of leaf spring arms 27 and 28 secured at points 29 and 30 to lateral sides 16 and 17 of each casing. The spring arms 27 and 28 carry detent portions 31 and 32, respectively, which pass through openings 33 and 34, respectively, in sides 16 and 17 and engage the respective edges 35 and 36 of the inserts. The forces of the spring arms 27 and 28 are in opposition to each other so as to firmly retain the insert 23 therebetween. A compressed air tube 37 is secured to a casing 11 at the back end 18 and has air vents 38 for spraying the hot bottle 26 near the neck 27 thereof with cool air.

As seen particularly in Figure 5, actuating arms 14 and 15 are pivotally secured at 39 and 40, respectively, to a member 41 of a bottle moving apparatus (not shown). A plunger 42 is pivotally provided at its lower end 43 with two lever arms 44 and 45 which are pivotally secured to actuating arms 14 and 15, respectively, whereby upward movement of plunger 42 causes inward movement of actuating arms 14 and 15 with consequential abutting engagement of refractory inserts 23 about the neck of the bottle 26. Member 41 is provided with a loop bracket 46 disposed about plunger 42. A compressed spring 47 is disposed concentrically about plunger 42 and in abutment against both loop 46 and a washer portion 48 of the plunger 42 so as to maintain spring biased engagement of the refractory inserts 23 about the neck of the bottle 26. Plunger 42 may be either manually or automatically actuated, for release of the bottle, by downward depression upon the top button 49. Of course, break-away molds 50 and 51 will be pivoted or otherwise cleared away from the newly molded bottle 26 prior to removal of the bottle by the moving apparatus and gripping device.

In the process of manufacturing bottles, it is often necessary to change the size and/or shape of the configurational surface 24 of refractory inserts 23 in order to conform to the size and type of bottle neck being molded. The present invention permits rapid and easy changing of such inserts without major loss of time in the operation of the automatic system usually employed for such processes.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. In a device for removing a hot bottle from a bottle-making mold, bottle take-out jaws comprising: a pair of casings, each having an open end adapted to face the other, a pair of refractory elements, each secured within and to a respective one of said casings and having a portion projected through said open end, said portion being cut out to engage the neck of a bottle to be gripped, and means for moving said casings toward and away from each other for corresponding engagement and disengagement of said portions of said elements about such bottle neck.

2. In a device for removing a hot bottle from a bottle-making mold, bottle take-out jaws comprising: a pair of casings, each having an open end adapted to face the other; a pair of refractory elements, each being inserted into a respective one of said casings through said open end and having a portion remaining projected through said open end, said portion being cut out to engage the neck of a bottle to be gripped; means for moving said casings toward and away from each other for corresponding engagement and disengagement of said portions of said elements about such bottle neck; and spring means for removably securing said elements to said respective casings.

3. Bottle take-out jaws in accordance with claim 2 wherein each of said casings is provided with two lateral opposing sides, each of said sides having an aperture therein, and said securing means comprises a plurality of leaf springs, each of said springs being secured to a respective one of said sides and having a detent portion passing through said aperture for engagement with said element.

4. In a device for removing a hot bottle from a bottle-making mold, bottle take-out jaws comprising: a pair of flat hollow casings, each having a closed back end, two closed sides, an open front end, and top and bottom plates, said open ends being adapted to face each other, and said sides each having an aperture; a pair of refractory elements, each being inserted into a respective one of said hollow casings and loosely filling the hollow thereof; said elements each having a portion projected through said open end, said portions being cut out to engage the neck of a bottle to be gripped; means for moving said casings toward and away from each other for corresponding engagement and disengagement of said portions of said elements about such bottle neck; and four leaf springs, each of said springs being secured to a respective one of said sides on the outside thereof and having a detent portion passing through said side aperture for spring biased engagement with a corresponding said element whereby said element is removably secured within its corresponding said casing.

References Cited in the file of this patent
UNITED STATES PATENTS

| | | |
|---|---|---|
| 1,795,665 | Miller | Mar. 10, 1931 |
| 1,909,813 | Crosbie | May 16, 1933 |
| 2,112,119 | Rowe | Mar. 22, 1938 |
| 2,634,552 | Woolling | Apr. 14, 1953 |
| 2,712,405 | Rock Castle | July 5, 1955 |
| 2,749,173 | Peterson | June 5, 1956 |